United States Patent
Hagisato

(10) Patent No.: US 9,821,706 B2
(45) Date of Patent: Nov. 21, 2017

(54) ILLUMINATING DEVICE, ILLUMINATING METHOD, PROGRAM, AND MEDIUM

(71) Applicant: TOYOTA JIDOSHA KABUSHIKI KAISHA, Toyota-shi, Aichi-ken (JP)

(72) Inventor: Yasuo Hagisato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 14/889,102

(22) PCT Filed: May 13, 2014

(86) PCT No.: PCT/IB2014/000713
§ 371 (c)(1),
(2) Date: Nov. 4, 2015

(87) PCT Pub. No.: WO2014/184634
PCT Pub. Date: Nov. 20, 2014

(65) Prior Publication Data
US 2016/0152174 A1    Jun. 2, 2016

(30) Foreign Application Priority Data

May 16, 2013    (JP) .................................. 2013-104468

(51) Int. Cl.
*B60Q 1/04* (2006.01)
*B60Q 1/14* (2006.01)

(52) U.S. Cl.
CPC ........... *B60Q 1/1438* (2013.01); *B60Q 1/143* (2013.01); *B60Q 2300/056* (2013.01); *B60Q 2300/41* (2013.01); *B60Q 2300/42* (2013.01)

(58) Field of Classification Search
CPC ................. B60Q 1/1438; B60Q 1/143; B60Q 2300/056; B60Q 2300/41; B60Q 2300/42; B60Q 2300/40
See application file for complete search history.

(56) References Cited

U.S. PATENT DOCUMENTS

| | | | |
|---|---|---|---|
| 2008/0130302 A1 | 6/2008 | Watanabe | |
| 2009/0043458 A1 | 2/2009 | Kamioka et al. | |
| 2013/0215630 A1* | 8/2013 | Lee | B60Q 1/143 362/465 |
| 2015/0151669 A1* | 6/2015 | Meisner | B60Q 1/085 701/49 |

FOREIGN PATENT DOCUMENTS

| | | |
|---|---|---|
| DE | 102008012327 A1 | 9/2008 |
| DE | 102009057032 A1 | 6/2011 |
| EP | 2100771 A2 | 9/2009 |
| EP | 2551155 A2 | 1/2013 |

(Continued)

OTHER PUBLICATIONS

Oct. 28, 2014 International Search Report issued in International Patent Application No. PCT/IB2014/000713.

*Primary Examiner* — Y M. Lee
(74) *Attorney, Agent, or Firm* — Oliff PLC

(57) ABSTRACT

An illuminating device includes a detecting section configured to detect a vehicle height of a forward vehicle running in front of a vehicle; and a control section configured to control an illuminating range of a head lamp of the vehicle according to the vehicle height.

8 Claims, 8 Drawing Sheets

(56) References Cited

FOREIGN PATENT DOCUMENTS

| | | | |
|---|---|---|---|
| JP | 2007-112249 | A | 5/2007 |
| JP | 2008-137516 | A | 6/2008 |
| JP | 2009-220636 | A | 10/2009 |
| JP | 2012-020715 | A | 2/2012 |
| JP | 2013-023182 | A | 2/2013 |
| WO | 2009/039882 | A1 | 4/2009 |

* cited by examiner

ILLUMINATING DEVICE, ILLUMINATING METHOD, PROGRAM, AND MEDIUM

BACKGROUND OF THE INVENTION

1. Field of the Invention

The present invention relates to an illuminating device, an illuminating method, a program, and a medium each of which is applied to a vehicle such as a passenger vehicle, a commercial vehicle, a bus, or the like so as to irradiate an area in front of the vehicle.

2. Description of Related Art

Various devices are proposed as an illuminating device that irradiates an area in front of a vehicle so as to improve visibility of a driver. For example, Japanese Patent Application Publication No. 2009-220636 (JP 2009-220636 A) proposes a technique in which a distance with respect to a precedent vehicle is detected and an illuminating range is gradually enlarged upward according to the distance. An illuminating device described in JP 2009-220636 A is intended to secure visibility of a driver of its own vehicle by increasing the number of situations to use a high beam, and to increase a glare-prevention characteristic in which illuminating in an illuminating range is blocked appropriately so as not to give a glare (dazzle) to an occupant in a forward vehicle, which is a precedent vehicle or an oncoming vehicle.

However, in the illuminating device described above, a boundary between an inside of the illuminating range and an outside (a light-blocking region) of the illuminating range is controlled to move proportionally based on the distance. On this account, even in a case where the precedent vehicle is a regular vehicle that is not a large-size vehicle, it is necessary to block upward illuminating in the illuminating range, and there is a possibility that the visibility of the driver, particularly with respect to indicators, cannot be increased.

SUMMARY OF THE INVENTION

In view of the above problem, the present invention provides an illuminating device, an illuminating method, a program, and a medium each of which is able to achieve both visibility of a driver and a glare-prevention characteristic more appropriately.

An illuminating device according to one aspect of the present invention includes: a detecting section configured to detect a vehicle height of a forward vehicle running in front of a vehicle; and a control section configured to control an illuminating range of a head lamp of the vehicle according to the vehicle height. Here, in a case where the vehicle height is less than a predetermined value, the control section may set the illuminating range so as to include an area located above the forward vehicle. The illuminating range may be set so that illuminating is blocked in part of the area located above the forward vehicle from a height corresponding to an upper portion of the forward vehicle. Further, the illuminating device may include a distance detecting section configured to detect a distance between the vehicle and the forward vehicle, and in a case where the distance is not more than a first distance, the control section may set a near light-blocking region in which illuminating is blocked from an upper edge of a maximum illuminating range of the illuminating range to an upper portion of the forward vehicle.

Further, the illuminating device may include a light detecting section configured to detect a light position of lights of the forward vehicle, and in a case where the distance is not less than a second distance, which is longer than the first distance, the control section may set a distant light-blocking region in which illuminating is blocked corresponding to the forward vehicle of which the vehicle height is not less than the predetermined value, on the basis of the light position within the maximum illuminating range of the illuminating range.

Further, in the illuminating device, in a case where the distance is between the first distance and the second distance, if the vehicle height is not more than the predetermined value, the control section may set a first light-blocking region in which illuminating is blocked corresponding to the forward vehicle of which the vehicle height is less than the predetermined value, on the basis of the light position within the maximum illuminating range of the illuminating range.

In addition, in the illuminating device, in the case where the distance is between the first distance and the second distance, if the vehicle height is larger than the predetermined value, the control section may set a second light-blocking region in which illuminating is blocked corresponding to the forward vehicle of which the vehicle height is not less than the predetermined value, on the basis of the light position within the maximum illuminating range of the illuminating range.

Further, in the illuminating device, the control section may perform a control so that a size of at least any one of the distant light blocking region, the first light-blocking region, and the second light-blocking region is inversely proportional to the distance, and the forward vehicle may be a precedent vehicle and/or an oncoming vehicle.

An illuminating method according to one aspect of the present invention includes: detecting a vehicle height of a forward vehicle running in front of a vehicle; and controlling an illuminating range of a head lamp of the vehicle according to the vehicle height. Further, a program according to one aspect of the present invention is a program causing a computer to execute the illuminating method. Further, a medium according to one aspect of the present invention is a medium in which to store the program.

According to the present invention, it is possible to provide an illuminating device, an illuminating method, a program, and a medium each of which is able to achieve both visibility of a driver and a glare-prevention characteristic more appropriately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A illustrates a case where a distance between a vehicle and a forward vehicle as a precedent vehicle is short;

FIG. 6B illustrates a case where the distance is long;

FIG. 6C illustrates a case where the distance is in a predetermined range and the forward vehicle is a regular vehicle;

FIG. 6D illustrates a case where the distance is in the predetermined range and the forward vehicle is a large-sized vehicle;

FIG. 7A illustrates a case where a distance between the vehicle and a forward vehicle as an oncoming vehicle is short;

FIG. 7B illustrates a case where the distance is long FIG. 7C illustrates a case where the distance is in a predetermined range and the forward vehicle is a regular vehicle;

FIG. 7D illustrates a case where the distance is in the predetermined range and the forward vehicle is a large-sized vehicle;

DETAILED DESCRIPTION OF EMBODIMENTS

The following describes embodiments of the present invention with reference to the attached drawings.

Figure 1:
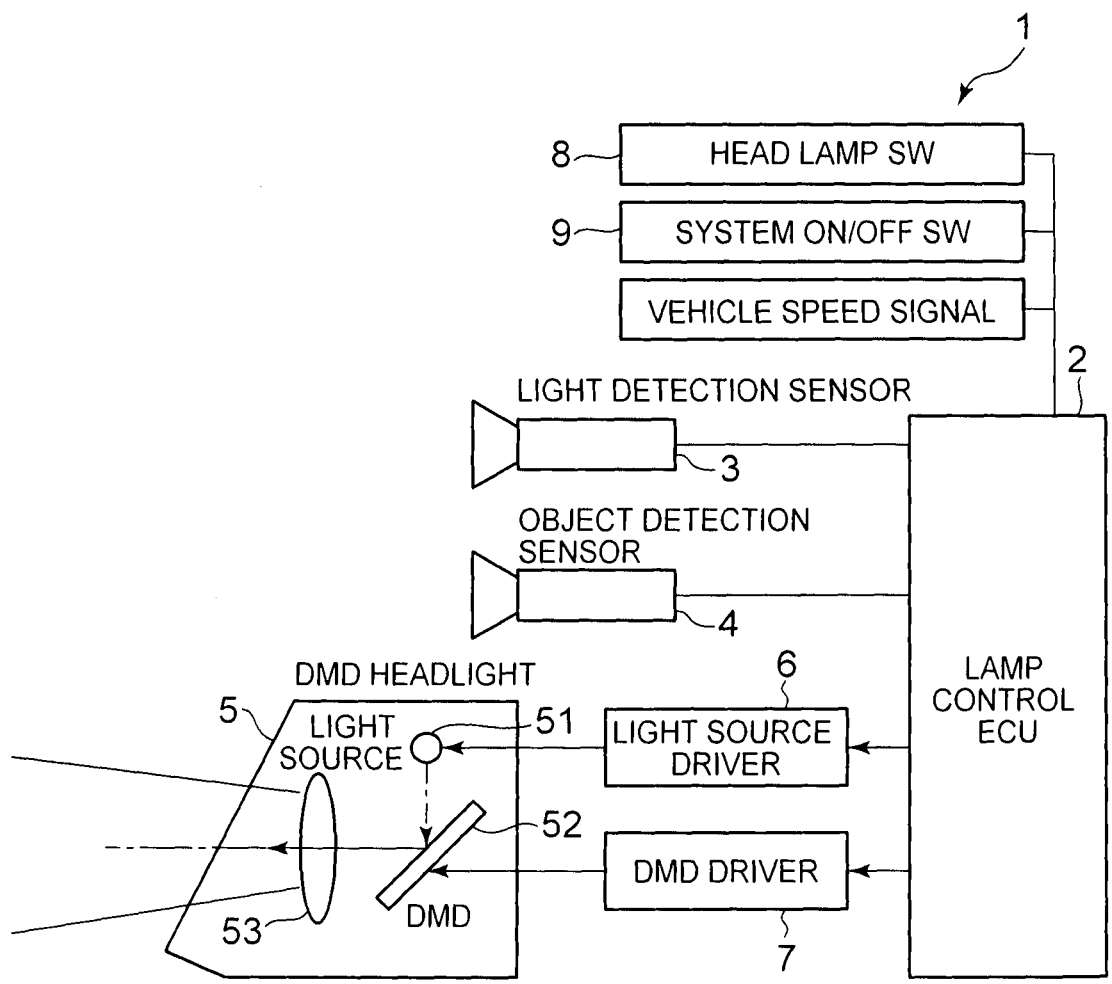
FIG. 1 is a schematic block diagram illustrating an illuminating device 1 of Embodiment 1 according to the present invention.

As illustrated in FIG. 1, an illuminating device 1 according to Embodiment 1 includes a lamp control ECU 2, a light detection sensor 3, an object detection sensor 4, a DMD headlight 5, a light source driver 6, a DMD driver 7, a head lamp switch 8, and a system on/off switch 9.

The lamp control ECU 2 is constituted, for example, by a CPU, an ROM, an RAM, a flash memory, a data bus that connects them to each other, and an input-output interface. The lamp control ECU 2 performs the following respective controls according to those programs of the present invention which are stored in the ROM or the flash memory (a medium according to the present invention), so as to configure a detecting section 2a, a distance detecting section 2b, and a control section 2c.

The lamp control ECU 2 is connected to a telecommunications standard such as CAN (Controller Area Network), so that the lamp control ECU 2 is connected to various ECUs including an engine ECU, a brake ECU, an EPS ECU, a body ECU, a navigation ECU, and the like (which are not illustrated herein) in a communicable manner via the CAN. In Embodiment 1, the lamp control ECU 2 is also connected to the head lamp switch 8 and the system on/off switch 9, so as to acquire various signals including a vehicle speed signal, a head lamp on/off signal, and a system on/off signal.

The light detection sensor 3 (a light detecting section) is provided, for example, in vicinity to a rearview mirror in a passenger compartment, so as to detect a light position HL of lights of a forward vehicle running in front of a vehicle, a presence of the forward vehicle, and a distance L between the vehicle and the forward vehicle, and to transmit a detection result to the lamp control ECU 2. In a case where the forward vehicle is a precedent vehicle, the light detection sensor 3 detects tail lamps as the lights, and in a case where the forward vehicle is an oncoming car, the light detection sensor 3 detects head lamps as the lights.

The object detection sensor 4 is provided, for example, in vicinity to the rearview mirror in the passenger compartment. The object detection sensor 4 detects an object by performing, in right and left directions, beam scanning on a road surface in front of the vehicle, and on a forward vehicle (a precedent vehicle, an oncoming vehicle) if there is a forward vehicle. Then, the object detection sensor 4 transmits data including a detection result to the lamp control ECU 2. If there is a forward vehicle, the detection result includes a vehicle height H thereof.

The DMD headlight 5 is described, for example, in Japanese Patent Application Publication No. 2008-137516 (JP 2008-137516 A) (note that an LED array may be used). The DMD headlight 5 is able to reflect, by a DMD (Digital Mirror Device) 52, light from one light source 51 based on a control by the control section 2c via the light source driver 6 and the DMD driver 7, so as to irradiate an area in front of the vehicle via a lens 53 in an illuminating range selectively set in the right and left directions and in up and down directions. Note that, in Embodiment 1, a range obtained by removing a light-blocking region from a maximum illuminating range is defined as the illuminating range. Further, the selection of the illuminating range includes ordinary selection between a low beam and a high beam.

The detecting section $2a$ of the lamp control ECU 2 detects a vehicle height H of the forward vehicle running in front of the vehicle based on the data from the object detection sensor 4. The control section $2c$ controls the illuminating range of head lamps of the vehicle according to the vehicle height.

Figure 2A:
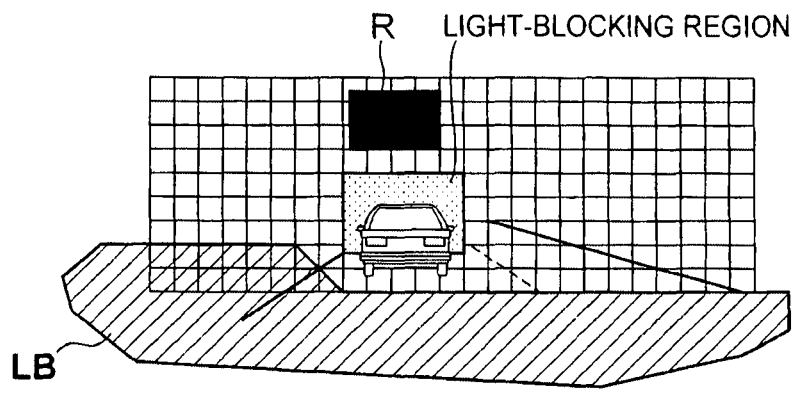
FIG. 2A is schematic views illustrating specific aspects of a light-blocking region where illuminating is blocked in an illuminating range of the illuminating device 1 of Embodiment 1.
Figure 2B:
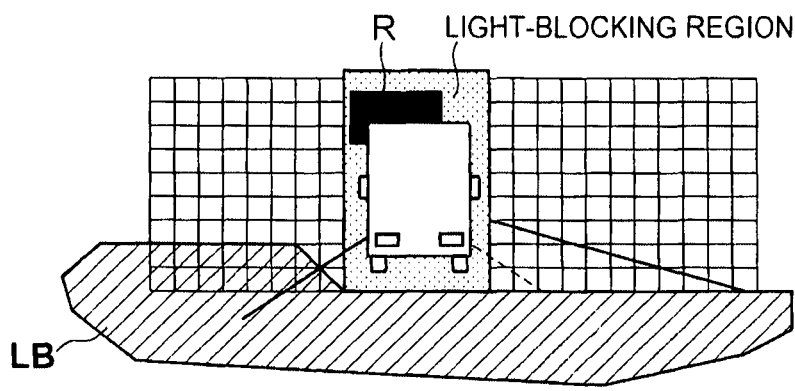
FIG. 2B is schematic views illustrating specific aspects of a light-blocking region where illuminating is blocked in an illuminating range of the illuminating device 1 of Embodiment 1.

In a case where the vehicle height H is lower than a predetermined value xm, the control section $2c$ of the lamp control ECU 2 sets the illuminating range so as to include an area located above the forward vehicle as illustrated in FIG. 2A. Note that, in Embodiment 1, the light-blocking region is set on an upper side relative to a lower edge of that rear end portion of the forward vehicle which includes bottom ends of tail lights thereof, and a bottom side relative to a lower edge of the light-blocking region is included in the illuminating range. In a case where the vehicle height is not less than the predetermined value xm, the control section $2c$ does not include, in the illuminating range, the area located above the forward vehicle, as illustrated in FIG. 2B. Note that, in FIG. 2, R indicates an indicator and LB indicates an illuminating range of the low beam. In the other drawings shown below, R indicates an indicator and LB indicates an illuminating range of the low beam.

Figure 3:
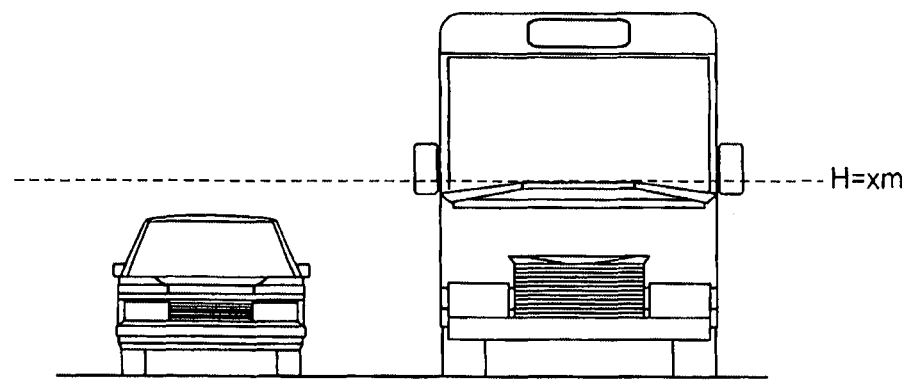
FIG. 3 is a schematic view illustrating a predetermined value xm used in a specific setting aspect of the light-blocking region where illuminating is blocked in the illuminating range of the illuminating device 1 of Embodiment 1.
Figure 4:
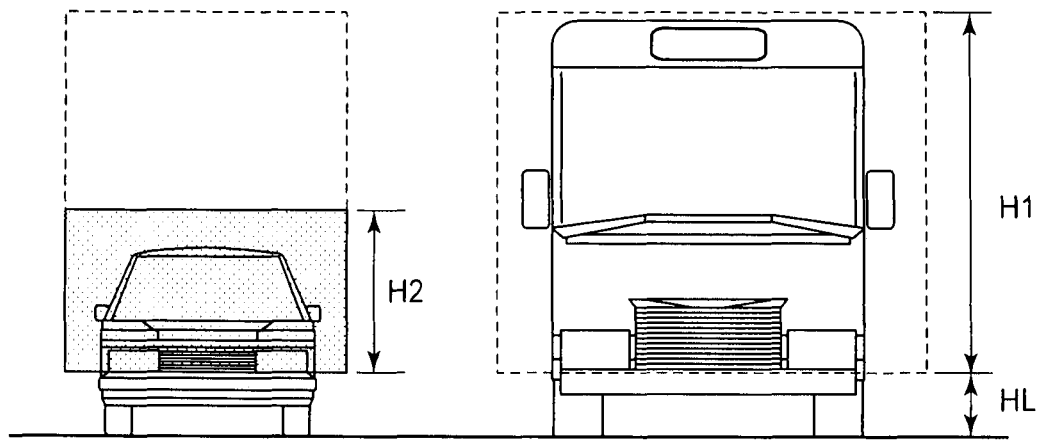
FIG. 4 is a schematic view illustrating that relationship between a vehicle height and the light-blocking region which is used for setting the light-blocking region where illuminating is blocked in the illuminating range of the illuminating device 1 of Embodiment 1.

As illustrated in FIG. 3, the predetermined value xm is a threshold by which it is possible to determine whether a vehicle is a regular vehicle or a larger-sized vehicle that is larger than the regular vehicle. Note that, in Embodiment 1, as illustrated in FIG. 4, a vehicle height of the large-sized vehicle from its light position HL is taken as H1, and a vehicle height of the regular vehicle from a position of its light is taken as H2.

Figure 5A:
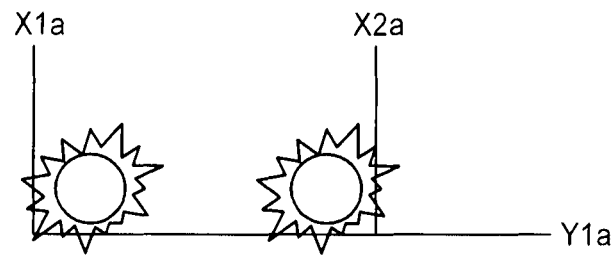
FIG. 5A is a schematic view illustrating that relationship between a light position HL and the vehicle height which is used for setting the light-blocking region where illuminating is blocked in the illuminating range of the illuminating device 1 of Embodiment 1.
Figure 5B:
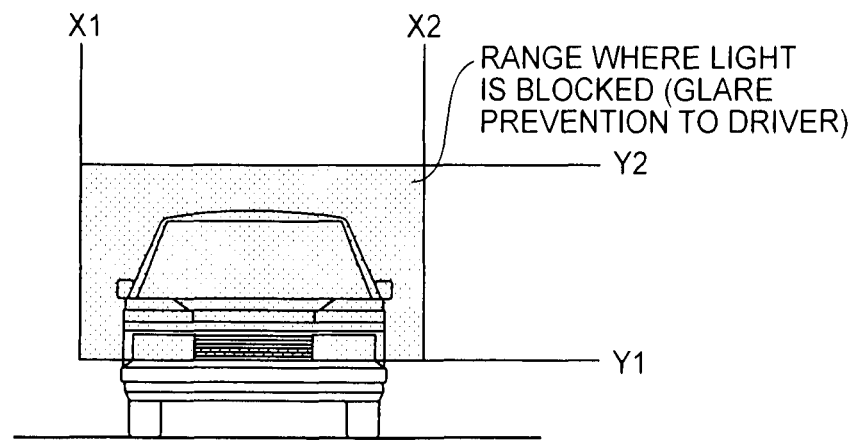
FIG. 5B is a schematic view illustrating that relationship between a light position HL and the vehicle height which is used for setting the light-blocking region where illuminating is blocked in the illuminating range of the illuminating device 1 of Embodiment 1.

To set the illuminating range so as to include an area located above the forward vehicle means that the illuminating range is set so that illuminating is blocked in part of the area located above the forward vehicle from a height corresponding to an upper portion of the forward vehicle. That is, as illustrated in FIG. 5A, since there is a pair of Y-coordinates Y$1a$ for right and left as the light position HL in the forward vehicle, a width of the light-blocking region is assumed a width "X$2a$-X$1a$" between the pair of Y-coordinates Y$1a$. In a case of the large-sized vehicle, a height of the light-blocking region is assumed a height obtained by adding the vehicle height H1 to the Y-coordinate Y$1a$, and in a case of the regular vehicle, the height of the light-blocking region is assumed a height obtained by adding the vehicle height H2 to the Y-coordinate Y1, as illustrated in FIG. 5B.

The distance detecting section $2b$ of the lamp control ECU 2 detects a distance L between the vehicle and the forward vehicle based on the detection result of the light detection sensor 3. Note that the distance detecting section $2b$ may detect the distance L by use of another radar sensor except the light detection sensor 3. In a case where the distance L is not more than a first distance L1 (e.g., 30 m), the control section $2c$ sets a near light-blocking region A in which illuminating is blocked from the upper portion of the forward vehicle to an upper edge of the maximum illuminating range, within the maximum illuminating range of the illuminating range. The near light-blocking region A in a case where the forward vehicle is a precedent vehicle is a range illustrated in FIG. 6A, and the near light-blocking region A in a case where the forward vehicle is an oncoming vehicle is a range illustrated in FIG. 7A.

Further, in a case where the distance L is not less than a second distance L2 (e.g., 120 m), which is longer than the first distance L1, the control section $2c$ sets a distant light-blocking region B in which illuminating is blocked for the large-sized vehicle, on the basis of the light position HL within the maximum illuminating range of the illuminating range. Areas shown by a broken line in FIG. 4 for the regular vehicle and the large-sized vehicle each indicate the distant light-blocking region B for the vehicle height H1 of the large-sized vehicle. The distant light-blocking region B in a case where the forward vehicle is a precedent vehicle is a range illustrated in FIG. 6B, and the distant light-blocking region B in a case where the forward vehicle is an oncoming vehicle is a range illustrated in FIG. 7B.

In a case where the distance L is between the first distance L1 and the second distance L2 (L1≤L≤L2: a predetermined range), if the vehicle height H is not more than the predetermined value xm (H≤xm) and thus the forward vehicle is the regular vehicle, the control section $2c$ may set a regular-vehicle light-blocking region C (a first light-blocking region) in which illuminating is blocked for the regular vehicle, on the basis of the light position HL within the maximum illuminating range of the illuminating range. The regular-vehicle light-blocking region C in a case where the forward vehicle is a precedent vehicle is a range illustrated in FIG. 6C, and the regular-vehicle light-blocking region C in a case where the forward vehicle is an oncoming vehicle is a range illustrated in FIG. 7C. A width and a height of the regular-vehicle light-blocking region C are fit values obtained by adding given margins to a width and a height of the regular vehicle. Note that, in FIGS. 6A, 6B, 6C, and FIGS. 7A, 7B, 7C, each light-blocking region is set above a lower edge of that rear end portion of the forward vehicle which includes bottom ends of tail lights or head lamps thereof, and a bottom side relative to a lower edge of the light-blocking region is included in the illuminating range.

Further, in the case where the distance L is between the first distance L1 and the second distance L2, if the vehicle height H is larger than the predetermined value xm and thus the forward vehicle is the large-sized vehicle, the control section $2c$ sets a large-sized-vehicle light-blocking region D (a second light-blocking region) in which illuminating is blocked for the large-sized vehicle, on the basis of the light position HL within the maximum illuminating range for the illuminating range. The large-sized-vehicle light-blocking region D in a case where the forward vehicle is a precedent vehicle is a range illustrated in FIG. 6D, and the large-sized-vehicle light-blocking region D in a case where the forward vehicle is an oncoming vehicle is a range illustrated in FIG. 7D. A width and a height of the large-sized-vehicle light-blocking region D are also fit values obtained by adding given margins to a width and a height of the large-sized vehicle.

Note that, in Embodiment 1, the control section $2c$ controls respective sizes of the distant light-blocking region B, the regular-vehicle light-blocking region C, and the large-sized-vehicle light-blocking region D so as to be inversely proportional to the distance L.

Figure 8:
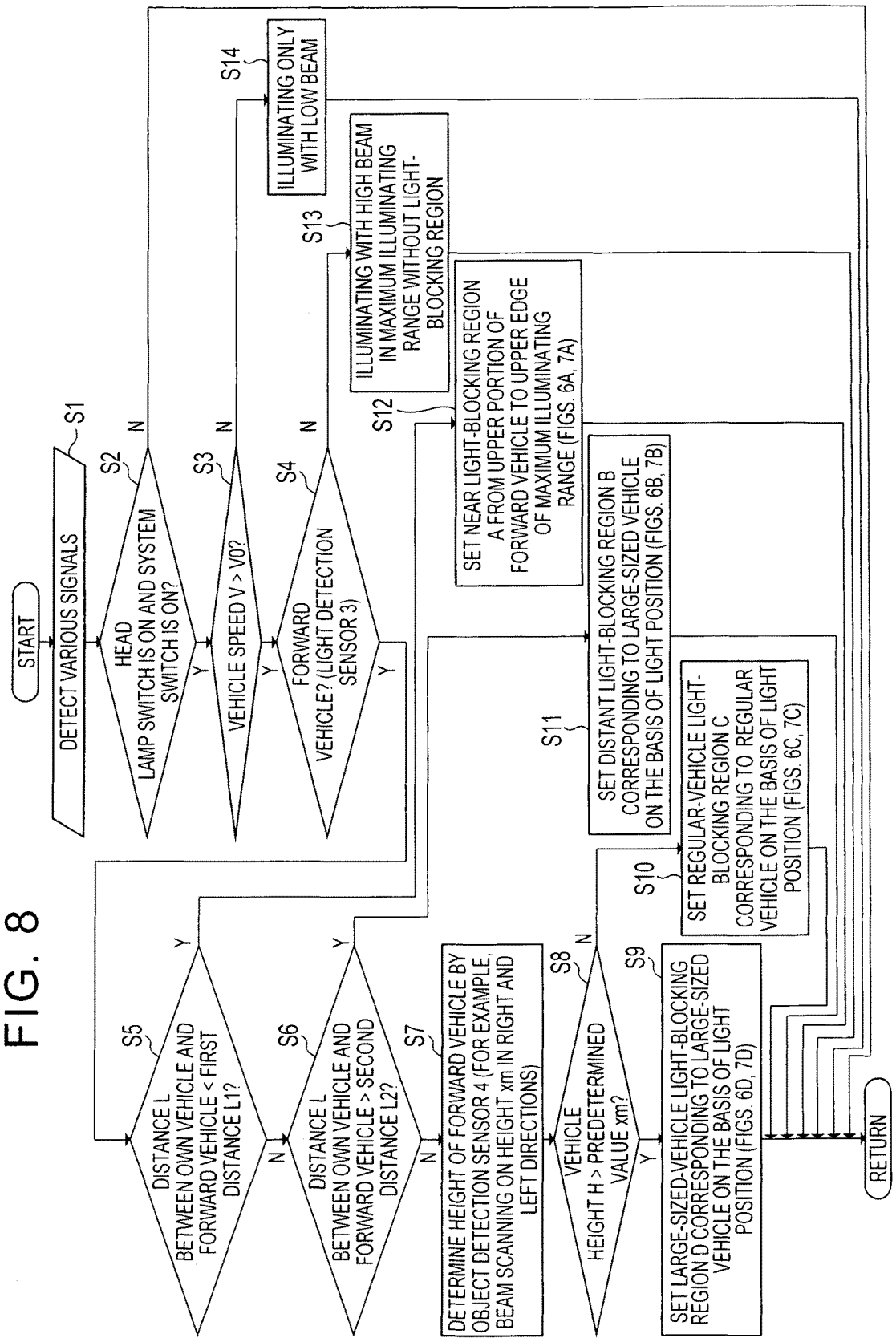
FIG. 8 is a flow chart illustrating a control content of the illuminating device 1 of Embodiment 1.

The following describes a control content of the lamp control ECU 2 of Embodiment 1 with the use of a flow chart of FIG. 8. In step S1 of FIG. 8, the detecting section $2a$ of the lamp control ECU 2 acquires and detects a vehicle speed V over the CAN, a head lamp switch ON signal from the head lamp switch 8, a system ON signal from the system on/off switch 9, a detection result from the light detection sensor 3, and a detection result from the object detection sensor 4.

In step S2, the detecting section 2*a* determines whether the head lamp switch is ON and a system switch is ON. In a case of YES in the determination, a process advances to step S3, and in a case of NO in the determination, the process advances just before RETURN.

In step S3, it is determined whether the vehicle speed V is larger than a vehicle speed V0 (e.g., 15 km/h) or not. In a case of NO in the determination, the process advances to step S14, so that the control section 2*c* performs a control to perform illuminating only with the low beam, and in a case of YES in the determination, the process advances to step S4.

In step S4, the control section 2*c* determines whether there is a forward vehicle or not based on the detection result from the light detection sensor 3. In a case of YES in the determination, the process advances to step S5, and in a case of NO in the determination, the process advances to step S13, so that the control section 2*c* performs illuminating with the high beam in the maximum illuminating range without the light-blocking region.

Figure 6A:
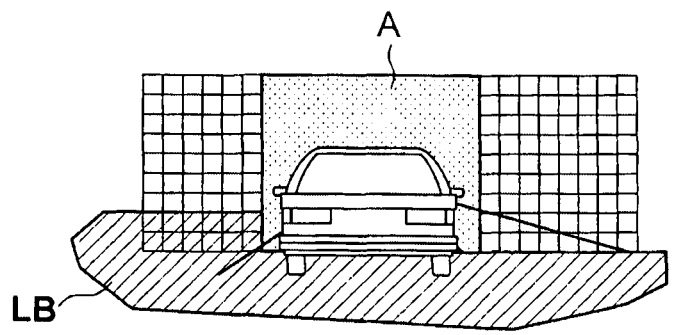
FIG. 6A is schematic views illustrating specific aspects of the light-blocking region where illuminating is blocked in the illuminating range of the illuminating device 1 of Embodiment 1.
Figure 7A:
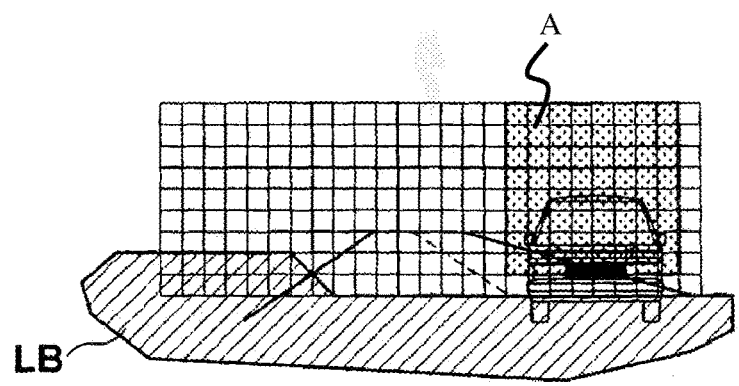
FIG. 7A is schematic views illustrating specific aspects of the light-blocking region where illuminating is blocked in the illuminating range of the illuminating device 1 of Embodiment 1.

In step S5, the control section 2*c* determines whether or not the distance L between the vehicle and the forward vehicle is larger than the first distance L1. In a case of YES in the determination, the process advances to step S12, so as to set the near light-blocking region A in which illuminating is blocked from the upper portion of the forward vehicle to the upper edge of the maximum illuminating range as illustrated in FIGS. 6A, 7A, thereby controlling the illuminating range of the DMD headlight 5. In a case of NO in the determination is step S5, the process advances to step S6.

Figure 6B:
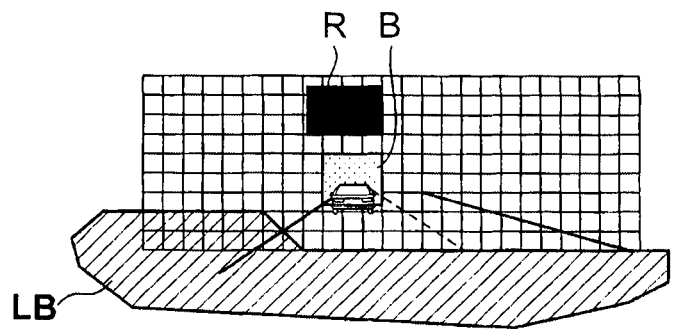
FIG. 6B is schematic views illustrating specific aspects of the light-blocking region where illuminating is blocked in the irradiation range of the illuminating device 1 of Embodiment 1.
Figure 7B:
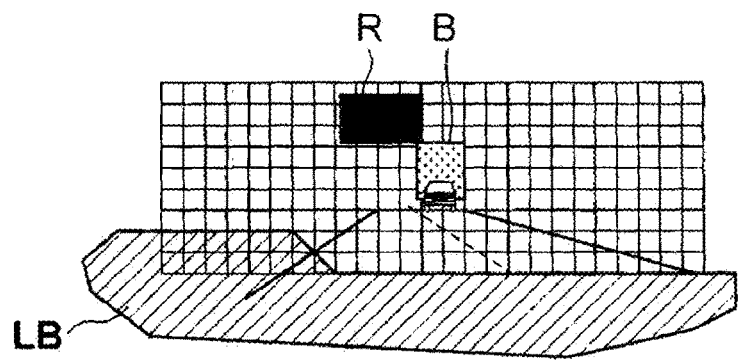
FIG. 7B is schematic views illustrating specific aspects of the light-blocking region where illuminating is blocked in the illuminating range of the illuminating device 1 of Embodiment 1.

In step S6, the control section 2*c* determines whether or not the distance L between the vehicle and the forward vehicle is larger than the second distance L2. In a case of YES in the determination, the process advances to step S11, so as to set the distant light-blocking region B for the large-sized vehicle on the basis of the light position HL as illustrated in FIGS. 6B, 7B, thereby controlling the illuminating range of the DMD headlight 5. In a case of NO in the determination is step S6, the process advances to step S7.

Figure 6C:
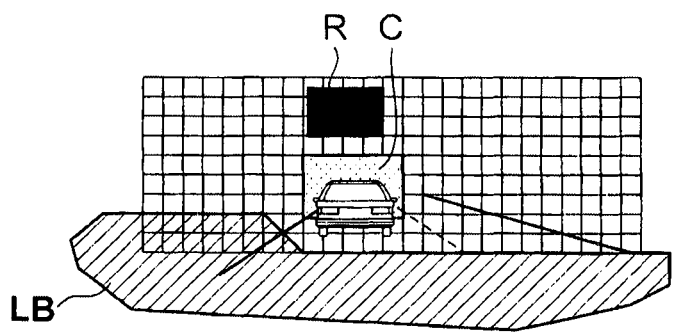
FIG. 6C is schematic views illustrating specific aspects of the light-blocking region where illuminating is blocked in the illuminating range of the illuminating device 1 of Embodiment 1.
Figure 7C:
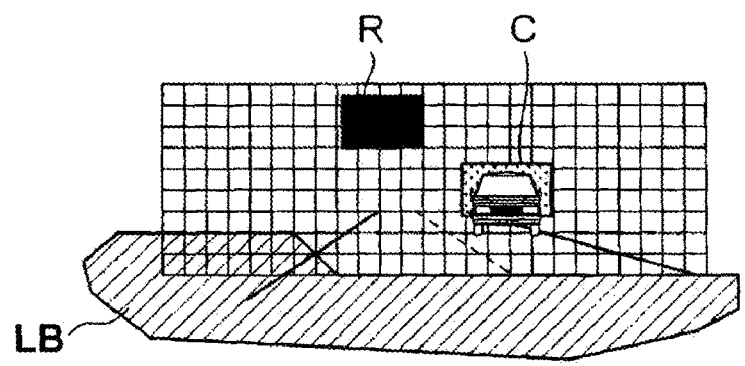
FIG. 7C is schematic views illustrating specific aspects of the light-blocking region where illuminating is blocked in the illuminating range of the illuminating device 1 of Embodiment 1.

In step S7, the control section 2*c* causes the object detection sensor 4 to detect a vehicle height H by performing, in the right and left directions, beam scanning on an area having a height of the predetermined value xm, and based on a detection result thereof, the control section 2*c* determines whether the vehicle height H is larger than the predetermined value xm or not in step S8. In a case of NO in the determination in step S7, the process advances to step S10, so that the control section 2*c* sets the regular-vehicle light-blocking region C for the regular vehicle on the basis of the light position HL as illustrated in FIGS. 6C, 7C, thereby controlling the illuminating range of the DMD headlight 5.

Figure 6D:
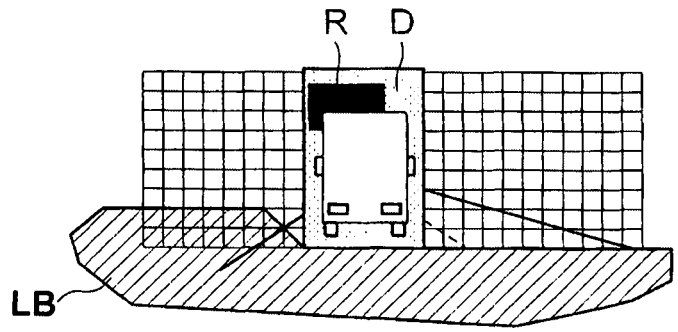
FIG. 6D is schematic views illustrating specific aspects of the light-blocking region where illuminating is blocked in the illuminating range of the illuminating device 1 of Embodiment 1.
Figure 7D:
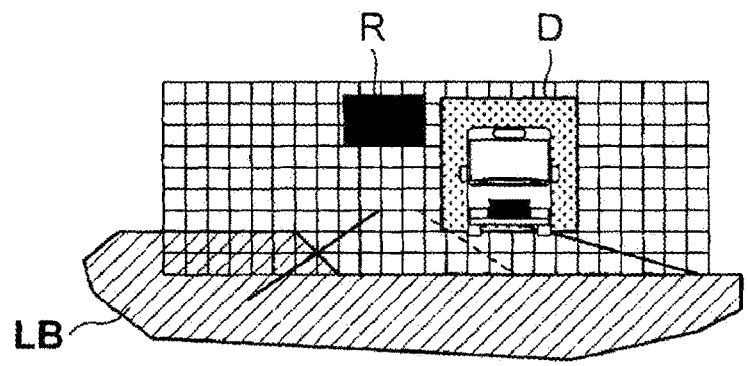
FIG. 7D is schematic views illustrating specific aspects of the light-blocking region where illuminating is blocked in the illuminating range of the illuminating device 1 of Embodiment 1.

In a case of YES in the determination in step S8, the process advances to step S9, so that the control section 2*c* set the large-sized-vehicle light-blocking region D for the large-sized vehicle on the basis of the light position HL as illustrated in FIGS. 6D, 7D, thereby controlling the illuminating range of the DMD headlight 5.

The flow chart of Embodiment 1 as illustrated in FIG. 8 is performed repeatedly every control period of the lamp control ECU 2, and thus, an illuminating method of the present invention is performed appropriately.

According to Embodiment 1, it is possible to yield the following operation-effects. That is, in a case where the forward vehicle is located in proximity to the vehicle, illuminating is blocked entirely from the upper portion of the forward vehicle to the upper edge of the maximum illuminating range as illustrated in FIGS. 6A, 7B, thereby making it possible to prevent a glare to an occupant of the forward vehicle.

Further, in a case where the forward vehicle is distant from the vehicle, it is possible to place the indicator R outside the distant light-blocking region B as illustrated in FIGS. 6B, 7B, thereby making it possible to improve visibility of an occupant of the vehicle. In addition, in a case where the vehicle height H of the forward vehicle is not more than the predetermined value xm in an area where the forward vehicle and the vehicle are located within a predetermined range, it is possible to place the indicator R outside the regular-vehicle light-blocking region C as illustrated in FIGS. 6C, 7C, thereby making it possible to improve the visibility of the occupant of the vehicle. Further, in a case where the vehicle height H of the forward vehicle is larger than the predetermined value xm in the area where the forward vehicle and the vehicle are located within the predetermined range, illuminating is blocked entirely from the upper portion of the forward vehicle to the upper edge of the maximum illuminating range as illustrated in FIGS. 6D, 7D, thereby making it possible to prevent a glare to the occupant of the forward vehicle. Further, except FIGS. 6D, 7D, each light-blocking region is set on the upper side relative to the lower edge of that rear end portion of the front vehicle which includes the bottom ends of the tail lights or head lamps thereof, and the bottom side relative to the lower edge of the light-blocking region is included in the illuminating range. This also makes it possible to achieve both the glare prevention to the occupant of the forward vehicle and the visibility of the occupant of the vehicle.

Note that, in Embodiment 1, the forward vehicle includes both a precedent vehicle and an oncoming vehicle, but the aforementioned setting process of the light-blocking region may be performed only on the precedent vehicle. Alternatively, the process may be performed only on the oncoming vehicle.

In this case, it is necessary to perform a type determination on whether the forward vehicle is a precedent vehicle or an oncoming vehicle, but it may be determined, for example, whether the forward vehicle is an oncoming vehicle or not by determining whether the forward vehicle approaches the vehicle. That is, in a case where coordinates of the forward vehicle moves to a near side in image information so as to approach the vehicle, it is determined that the forward vehicle is an oncoming vehicle, and in a case where the coordinates do not approach the vehicle, it is determined that the forward vehicle is a precedent vehicle.

Note that the type determination technique is not limited to the above technique, and any other techniques can be used provided that the techniques are able to distinguish the precedent vehicle from the oncoming vehicle. For example, in a case of the precedent vehicle, the forward vehicle has red light colors of tail lamps, and in a case of the oncoming vehicle, the forward vehicle has white light colors of head lamps. With the use of this fact, it is possible to perform the type determination based on a light color.

More specifically, based on color information included in the detection result from the light detection sensor 3, if a light color of the forward vehicle located in front of the vehicle belongs to red colors, the lamp control ECU 2 determines that the forward vehicle is the precedent vehicle. In the meantime, if the light color does not belong to red colors or the light color belongs to white colors, the lamp control ECU determines that the forward vehicle is the oncoming vehicle.

The determination technique on the precedent vehicle based on the vehicle height H and the predetermined value xm as described in Embodiment 1 is merely exemplification. That is, other than the discrimination between the regular vehicle and the large-sized vehicle as defined in Embodiment 1, the following discrimination may be performed, for example: a predetermined value xm may be defined with respect to different vehicle types having different vehicle heights H in terms of vehicle types classified according to Road Traffic Act, so that the different vehicle types may be distinguished from each other so as to set a first light-blocking region and a second light-blocking region respectively for the different vehicle types. Further, such an object detection sensor 4 that is able to perform beam scanning in the up and down directions may be used to determine the vehicle height H. The following describes this case as Embodiment 2.

Figure 9:
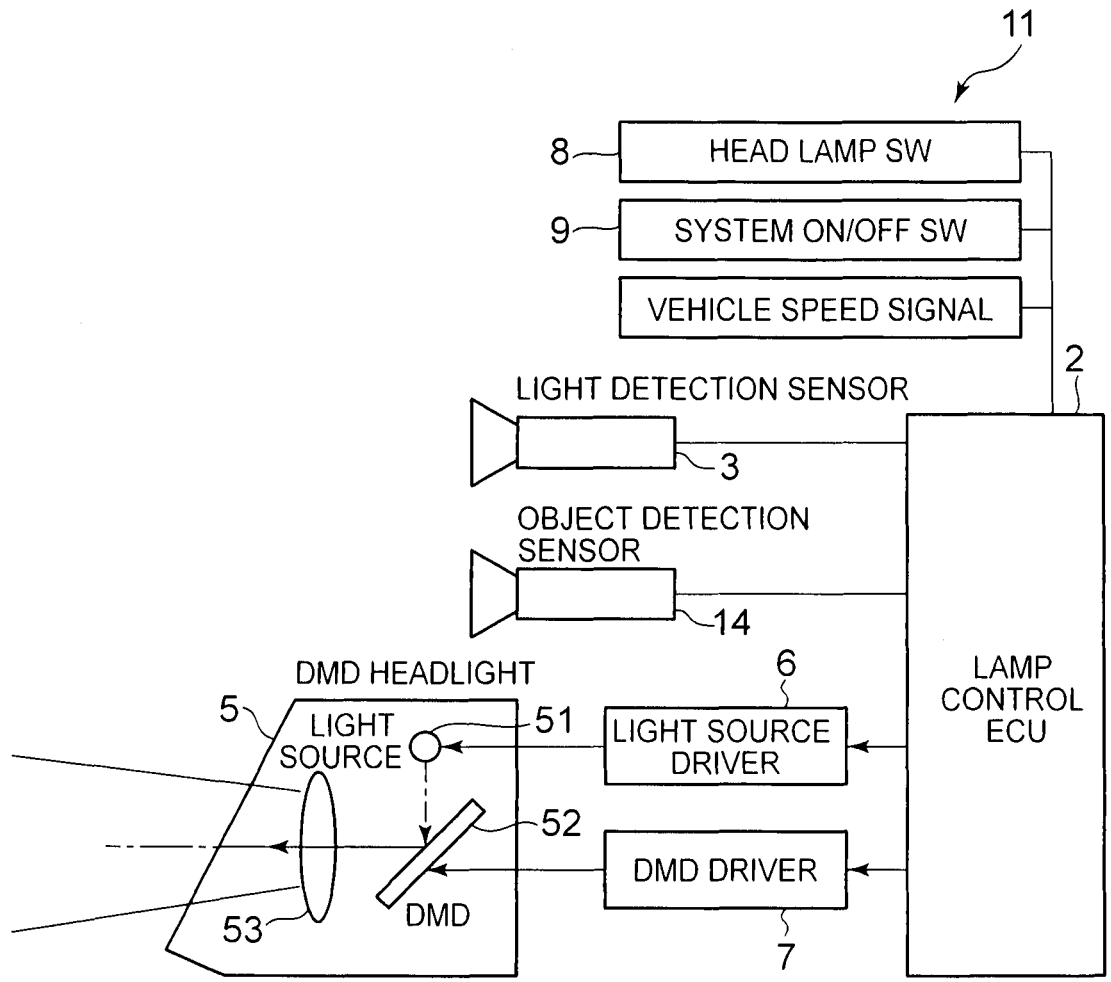
FIG. 9 is a schematic block diagram illustrating an illuminating device 11 of Embodiment 2 according to the present invention.
Figure 10:
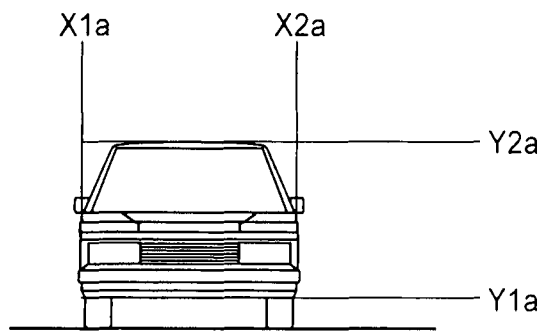
FIG. 10 is a schematic view illustrating a specific setting aspect of a light-blocking region where illuminating is blocked in an illuminating range of the illuminating device 11 of Embodiment 2.

A hard configuration of an illuminating device 11 of Embodiment 2 is basically similar to the illuminating device 1 illustrated in FIG. 1 of Embodiment 1, so that the following description mainly deals with differences therebetween. In Embodiment 2, as illustrated in FIG. 9, such an object detection sensor 14 that is able to perform beam scanning in up and down directions is used. That is, as illustrated in FIG. 10, the illuminating device 11 of Embodiment 2 is configured such that, based on a detection result of the object detection sensor 14, a detecting section 2a of a lamp control ECU 2 is able to detect a pair of coordinates Y1a for right and left, which are a Y-coordinate of a light position HL, a height Y2a of a vehicle, and a left end X1a and a right end X2a of the vehicle.

Figure 11:
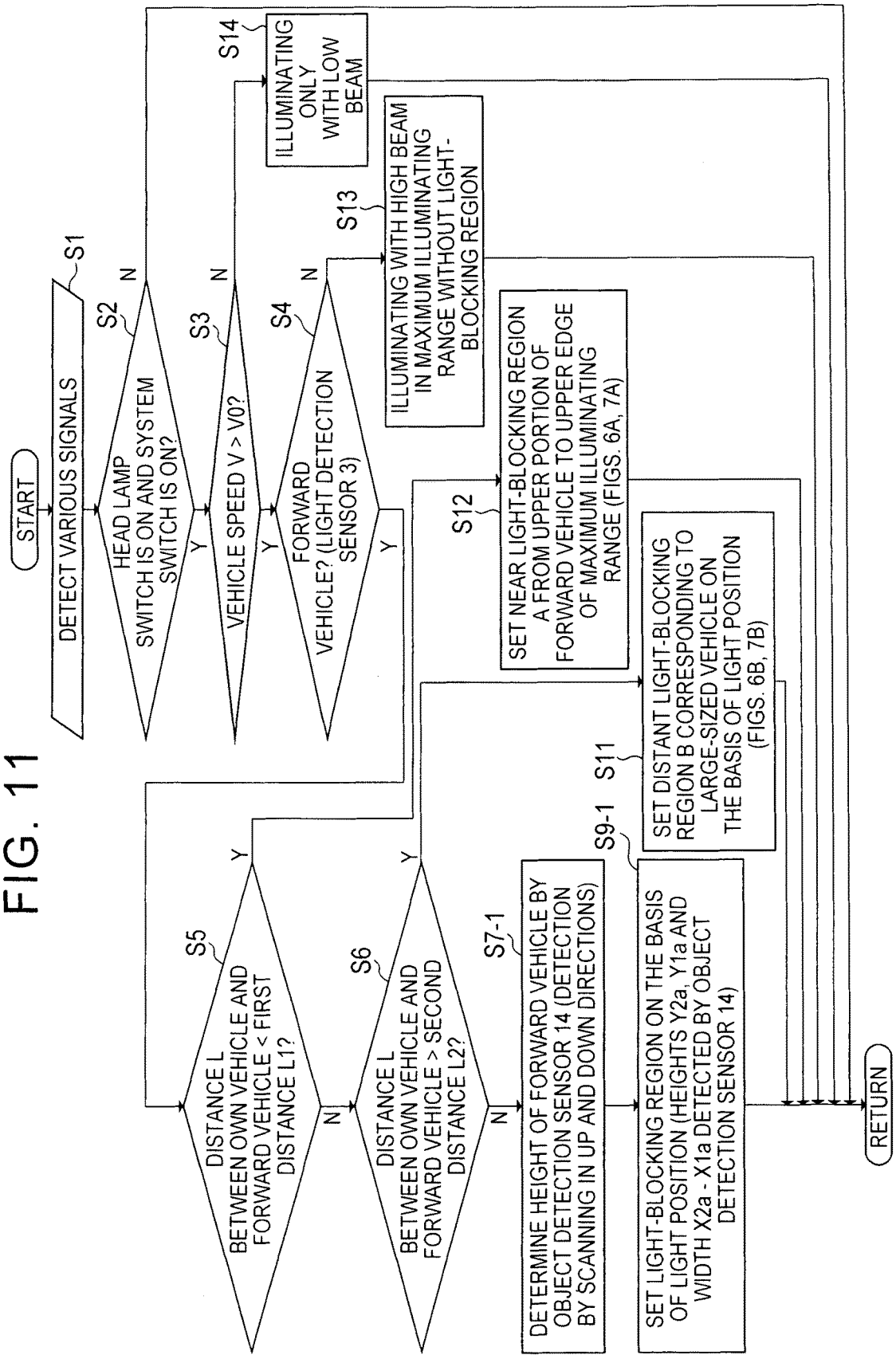
FIG. 11 is a flow chart illustrating a control content of the illuminating device 11 of Embodiment 2.

The following describes a control content of the lamp control ECU 2 of Embodiment 2 with the use of a flow chart of FIG. 11. Again, only differences are described below, because FIG. 11 is different from FIG. 8 only in step S7-1 and step S9-1.

In step S7-1 of FIG. 11, based on a detection result of the object detection sensor 14, the detecting section 2a of the lamp control ECU 2 detects a height "Y1a-Ya2" and a width "X2a-X1a" of a forward vehicle. In step S9-1, based on the height "Y1a-Y2a" and the width "X2a-X1a," the control section 2c continuously sets a height and a width of a light-blocking region including appropriate margins in height and width directions, so as to perform a control thereon.

According to the illuminating device 1 of Embodiment 2, it is possible to yield the following operation-effects. That is, similarly to Embodiment 1, in a case where the forward vehicle is located in proximity to a vehicle, illuminating is blocked entirely from an upper portion of the forward vehicle to an upper edge of a maximum illuminating range as illustrated in FIGS. 6A, 7A, so as to prevent a glare to an occupant of the forward vehicle. In the meantime, in a case where the forward vehicle is distant from the vehicle, it is possible to place an indicator R outside a distant light-blocking region B as illustrated in FIGS. 6B, 7B, thereby making it possible to improve visibility of an occupant of the vehicle. That is, it is possible to achieve both the glare prevention to the occupant of the forward vehicle and the visibility of the occupant of the vehicle.

In addition, in an area where the forward vehicle and the vehicle are located within a predetermined range, it is possible to continuously set the height and the width of the light-blocking region based on the height "Y1a=Y2a" and the width "X2a-X1a," so as to perform a control thereon. That is, in Embodiment 2, it is possible to minimize the light-blocking region with respect to forward vehicles having different heights and widths without classifying the forward vehicle and to achieve both the glare prevention to the occupant of the forward vehicle and the visibility of the occupant of the vehicle.

Preferred embodiments of the present invention have been described above in detail. However, the present invention is not limited to the above embodiments, and various modification and substitution can be added to the above embodiments without departing from the scope of the present invention.

The present invention relates to an illuminating device, an illuminating method, a program, and a medium, and is able to provide an illuminating device, an illuminating method, a program, and a medium each of which is able to achieve both visibility of a driver and a glare-prevention characteristic to a forward vehicle more appropriately. In view of this, the present invention is also usefully applicable to various vehicles such as a passenger car, a commercial vehicle, a bus, and the like.

The invention claimed is:

1. An illuminating device for a vehicle having a headlamp configured to illuminate a maximum illuminating range in front of the vehicle, the illuminating device comprising:
   a detecting section configured to detect a vehicle height of a forward vehicle running in front of the vehicle; and
   a control section configured to control an illuminating range of the head lamp of the vehicle according to the vehicle height, the illuminating range defined by blocking a light-blocking region from the maximum illuminating range of the head lamp of the vehicle, the light blocking region corresponding to the forward vehicle, wherein:
   as a result of the detecting section determining that the vehicle height is less than a predetermined value, the control section is configured to set the illuminating range so as to include an area located above the forward vehicle,
   as a result of the detecting section determining that the vehicle height is not less than the predetermined value, the control section is configured to set the illuminating range so as not to include the area located above the forward vehicle.

2. The illuminating device according to claim 1, wherein:
   the control section sets the illuminating range so that illuminating is blocked in part of the area located above the forward vehicle from a height corresponding to an upper portion of the forward vehicle.

3. The illuminating device according to claim 1, further comprising:
   a distance detecting section configured to detect a distance between the vehicle and the forward vehicle, wherein:
   as a result of the distance detecting section determining that the distance is not more than a first distance, the control section is configured to set a near light-blocking region in which illuminating is blocked from an upper edge of the maximum illuminating range of the illuminating range to an upper portion of the forward vehicle.

4. The illuminating device according to claim 3, further comprising:
   a light detecting section configured to detect a light position of lights of the forward vehicle, wherein:
   as a result of the distance detecting section determining that the distance is not less than a second distance, which is longer than the first distance, the control section is configured to set a distant light-blocking region in which illuminating is blocked corresponding to the forward vehicle of which the vehicle height is not less than the predetermined value, on the basis of the light position within the maximum illuminating range of the illuminating range.

5. The illuminating device according to claim 4, wherein:

as a result of the distance detecting section determining that the distance is between the first distance and the second distance, and as a result of the detecting section determining that the vehicle height is not more than the predetermined value, the control section is configured to set a first light-blocking region in which illuminating is blocked corresponding to the forward vehicle of which the vehicle height is less than the predetermined value, on the basis of the light position within the maximum illuminating range of the illuminating range.

6. The illuminating device according to claim 5, wherein:

as a result of the distance detecting section determining that the distance is between the first distance and the second distance, and as a result of the detecting section determining that the vehicle height is larger than the predetermined value, the control section is configured to set a second light-blocking region in which illuminating is blocked corresponding to the forward vehicle of which the vehicle height is not less than the predetermined value, on the basis of the light position within the maximum illuminating range of the illuminating range.

7. The illuminating device according to claim 6, wherein:

the control section is configured to perform a control so that a size of at least any one of the distant light blocking region, the first light-blocking region, and the second light-blocking region is inversely proportional to the distance.

8. A control method for a vehicle having a head lamp configured to illuminate a maximum illuminating range in front of the vehicle, the method comprising:

using a vehicle height detector to detect a vehicle height of a forward vehicle running in front of the vehicle; and controlling an illuminating range of the head lamp of the vehicle based on the vehicle height, the illuminating range defined by blocking a light-blocking region from the maximum illuminating range of the head lamp of the vehicle, the light blocking region corresponding to the forward vehicle, wherein:

as a result of the vehicle height detector detecting that the vehicle height is less than a predetermined value, the illuminating range is controlled so as to include an area located above the forward vehicle, as a result of the vehicle height detector detecting that the vehicle height is not less than the predetermined value, the illuminating range is controlled so as not to include the area located above the forward vehicle.

\* \* \* \* \*